United States Patent [19]
Bryan

[11] Patent Number: 5,762,308
[45] Date of Patent: Jun. 9, 1998

[54] GOLF UMBRELLA HOLDER

[76] Inventor: Leroy J. Bryan, R.D. #1., East Millsboro, Pa. 15468

[21] Appl. No.: 931,823

[22] Filed: Sep. 16, 1997

Related U.S. Application Data

[63] Continuation-in-part of Ser. No. 661,868, Jun. 11, 1996, abandoned.

[51] Int. Cl.$^6$ .................................................. A47F 5/00
[52] U.S. Cl. ........................ 248/314; 248/316.2; 135/16; 135/98; 403/110
[58] Field of Search .................. 135/16, 98, 99; 248/314, 534, 539, 316.2; 403/109, 110, 377

[56] References Cited

U.S. PATENT DOCUMENTS

| | | |
|---|---|---|
| D. 311,129 | 10/1990 | Barnhill, III. |
| 351,669 | 10/1886 | Tosso. |
| 852,517 | 5/1907 | Moss. |
| 1,542,754 | 6/1925 | Wragg. |
| 1,925,244 | 9/1933 | Goodrich. |
| 1,956,008 | 4/1934 | Diebel. |
| 2,628,797 | 2/1953 | Campomar ..................... 135/98 X |
| 2,806,711 | 9/1957 | Jacobs. |
| 2,822,143 | 2/1958 | Johansen. |
| 3,148,851 | 9/1964 | Condon. |
| 3,237,899 | 3/1966 | Lewis. |
| 3,304,035 | 2/1967 | Davis. |
| 3,304,036 | 2/1967 | Davis. |
| 3,602,466 | 8/1971 | Drowns. |
| 3,866,934 | 2/1975 | Braun. |
| 4,008,874 | 2/1977 | Conway, Jr.. |
| 4,017,998 | 4/1977 | Dumler. |
| 4,403,798 | 9/1983 | Smith. |
| 4,433,699 | 2/1984 | Schultes et al. .................... 135/98 X |
| 4,522,300 | 6/1985 | Hamblet. |
| 4,570,894 | 2/1986 | Miele. |
| 4,720,074 | 1/1988 | Gard et al.. |
| 4,836,232 | 6/1989 | De Rosa et al. ..................... 135/99 |
| 4,852,896 | 8/1989 | Mills. |
| 4,871,141 | 10/1989 | Chen. |
| 4,974,807 | 12/1990 | Moineau. |
| 5,105,958 | 4/1992 | Patton. |
| 5,152,495 | 10/1992 | Jacinto et al. ..................... 135/98 X |
| 5,396,915 | 3/1995 | Bomar. |
| 5,431,364 | 7/1995 | Etter. |
| 5,584,210 | 12/1996 | Gelbein ................................ 403/110 |

FOREIGN PATENT DOCUMENTS

| | | | |
|---|---|---|---|
| 3309340 | 9/1984 | Germany ........................... 135/16 |
| 451983 | 10/1949 | Italy. |
| 5068 | 3/1889 | United Kingdom. |
| 1272460 | 4/1972 | United Kingdom ............. 135/16 |

*Primary Examiner*—Lanna Mai
*Attorney, Agent, or Firm*—Webb Ziesenheim Bruening Logsdon Orkin & Hanson, P.C.

[57] ABSTRACT

An umbrella holder includes a container adapted to receive an umbrella handle. A clamp secures the container to a frame member of a golf cart or the like. A lever support has a pair of opposing arms connected on opposite sides of a slot formed in the container. A latch or lever is positioned between the opposing arms and is pivotable about a pivot axis extending therebetween. The latch has a boss that is receivable in a locking aperture formed in one of the opposing arms. A protrusion formed on the latch is moveable into the container via the slot in response to pivoting the latch between the opposing arms. The protrusion and the inside wall of the container coact to form an interstice smaller than the diameter of the umbrella handle when the boss is received in the receiving aperture.

14 Claims, 8 Drawing Sheets

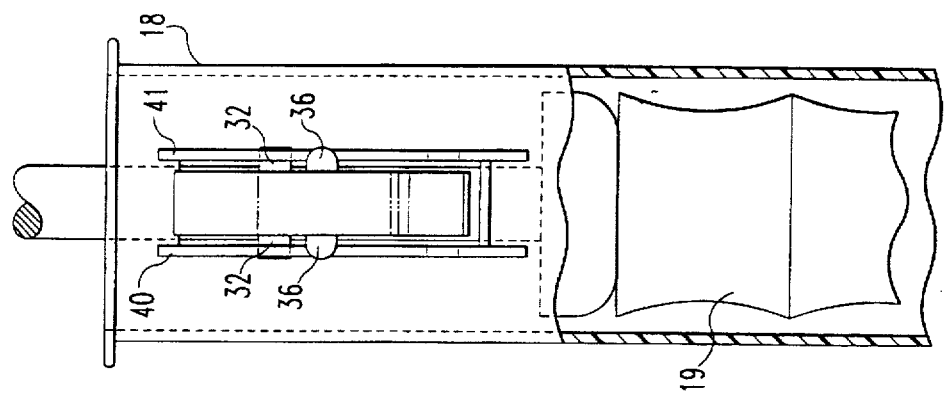
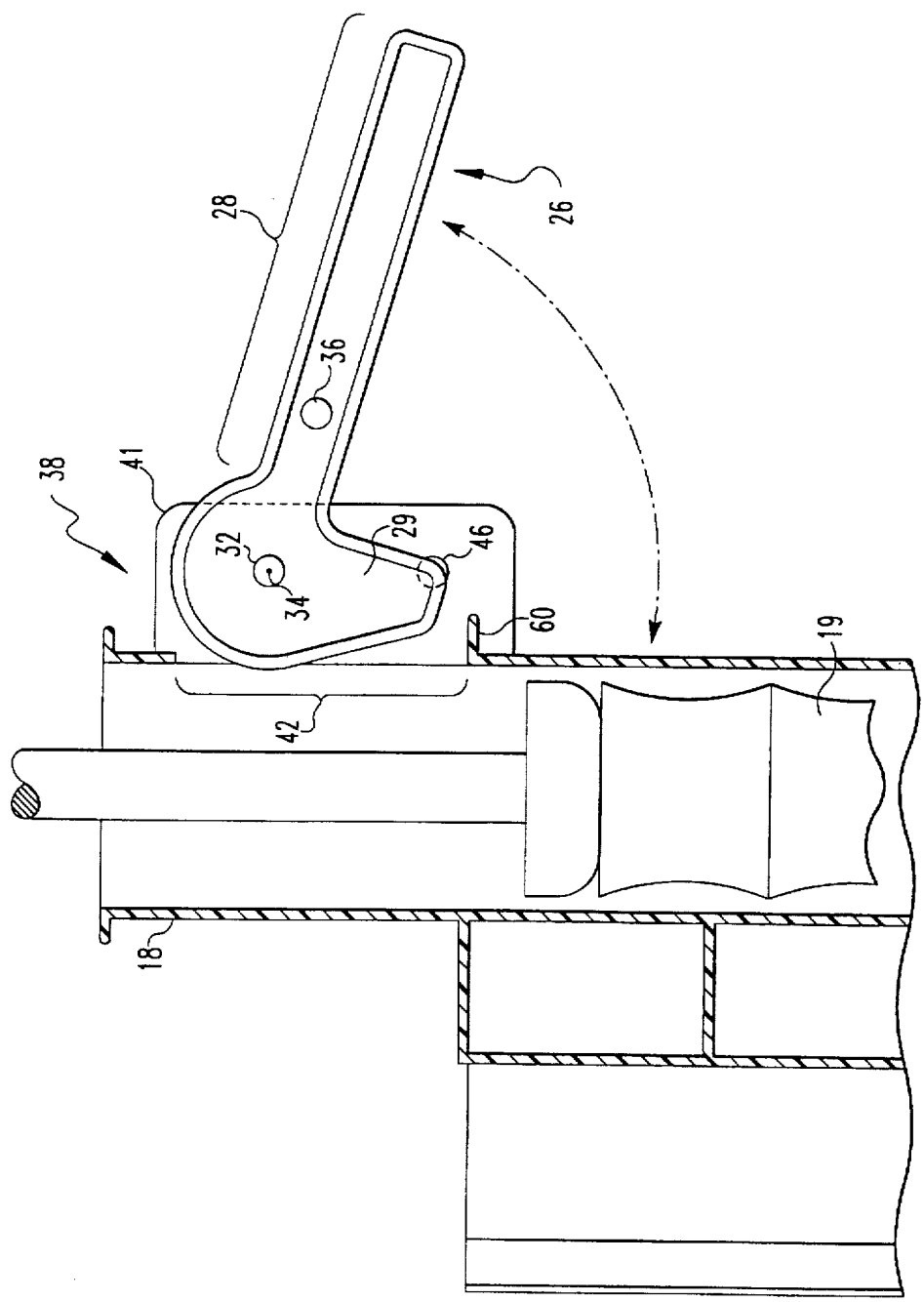
FIG. 6B
FIG. 6A

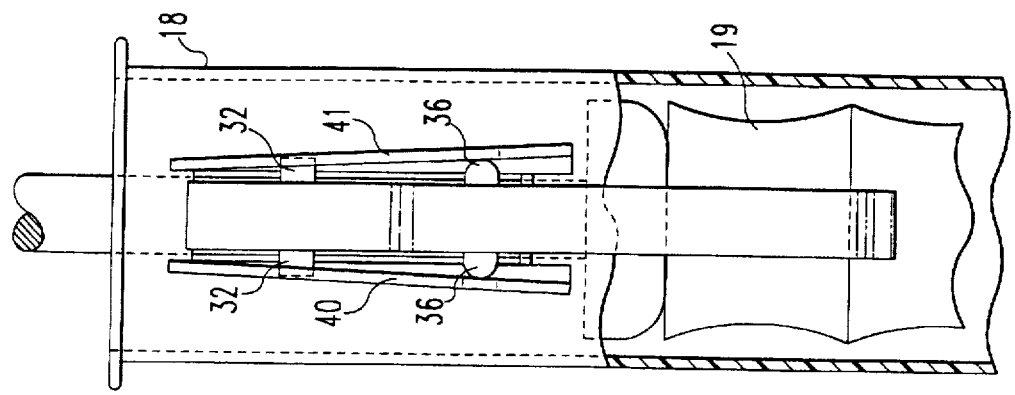
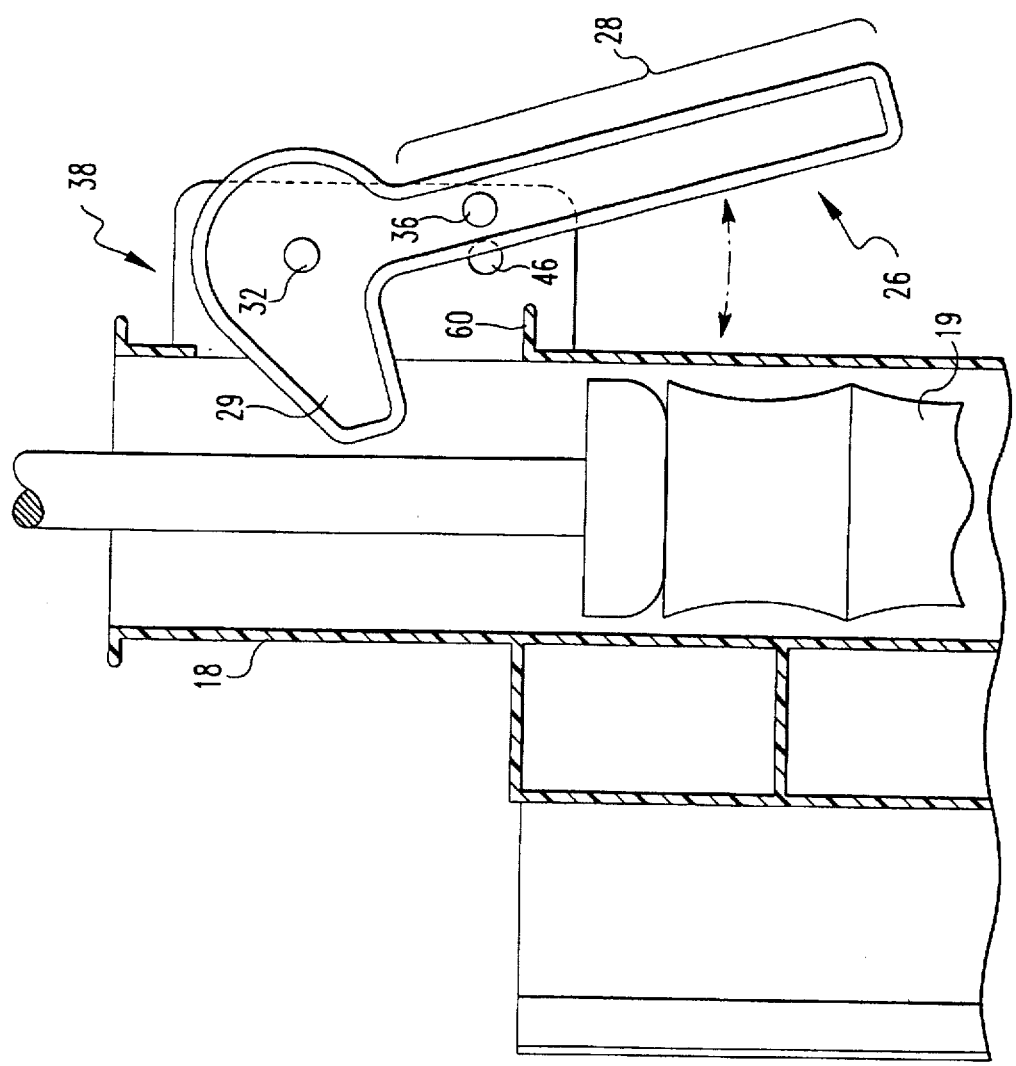
FIG. 7B
FIG. 7A

GOLF UMBRELLA HOLDER

CROSS REFERENCE TO RELATED APPLICATION

This application is a continuation-in-part of U.S. application Ser. No. 08/661,868, filed Jun. 11, 1996 and entitled "Golf Umbrella Holder", now abandoned.

BACKGROUND OF THE INVENTION

1. Field of the Invention

This invention relates to umbrella holders and, more particularly, to umbrella holders for use with golf carts or the like.

2. Description of the Prior Art

Golf carts equipped with canopies do not protect golfers from sun and rain when leaving the shelter of the canopy to hit a golf ball. When leaving the protection of the canopy, golfers often utilize umbrellas for protection against the sun and rain. When taking a golf shot, however, the golfer must either close the umbrella for storage in the cart or deposit the open or closed umbrella on the ground. Similarly, when riding in the golf cart between shots, the golfer must either close the umbrella for storage in the cart or hold the open umbrella manually outside of the golf cart.

It is an object of the present invention to provide an umbrella holder which attaches to the golf cart and which enables the open umbrella to be held therein.

SUMMARY OF THE INVENTION

Accordingly, I have invented an umbrella holder which includes a container adapted to receive a handle of an umbrella through an open end thereof. A clamp is attached to the container and is adapted to secure the container to a frame member of a golf cart. A latch support is provided having a pair of opposed arms attached to the container on opposite sides of a slot formed in a side wall of the container. A latch or lever is attached to the latch support between the opposing arms thereof and is pivotable about a pivot axis extending therebetween. The latch has a boss that is receivable in a locking aperture formed in one of the arms. The latch has a protrusion that is moveable into and out of the container through the slot in response to pivoting the latch between the opposing arms and about the pivot axis. The protrusion and an inside wall of the container coact to form an interstice smaller than the diameter of the handle of the umbrella when the protrusion extends into the container and the boss is received in the locking aperture.

The latch, the latch support and the container coact so that outward movement of the umbrella handle from the container engages the umbrella handle and the protrusion. This engagement rotates the latch about the pivot axis and moves a handle of the latch toward the container.

BRIEF DESCRIPTION OF THE DRAWINGS

FIG. 6A is a side view of a portion of the umbrella holder of FIG. 2 with a lever in an outermost position;

FIG. 6B is an end view of the umbrella holder of FIG. 6A;

FIG. 7A is a side view, similar to FIG. 6A, of a portion of the umbrella holder of FIG. 2 with the lever in an intermediate position;

FIG. 7B is an end view, similar to FIG. 6B, of the umbrella holder of FIG. 7A;

DETAILED DESCRIPTION OF THE PREFERRED EMBODIMENT

Figure 1A:
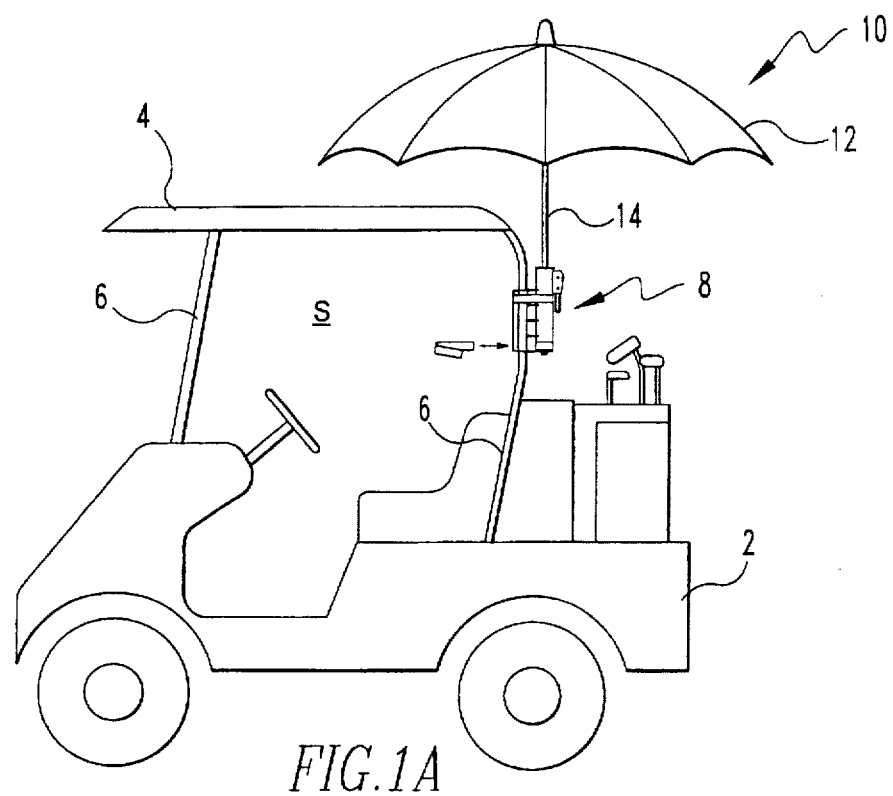
FIG. 1A is a side view of an umbrella received in an umbrella holder of the present invention which is secured to a frame member of a golf cart.
Figure 1B:
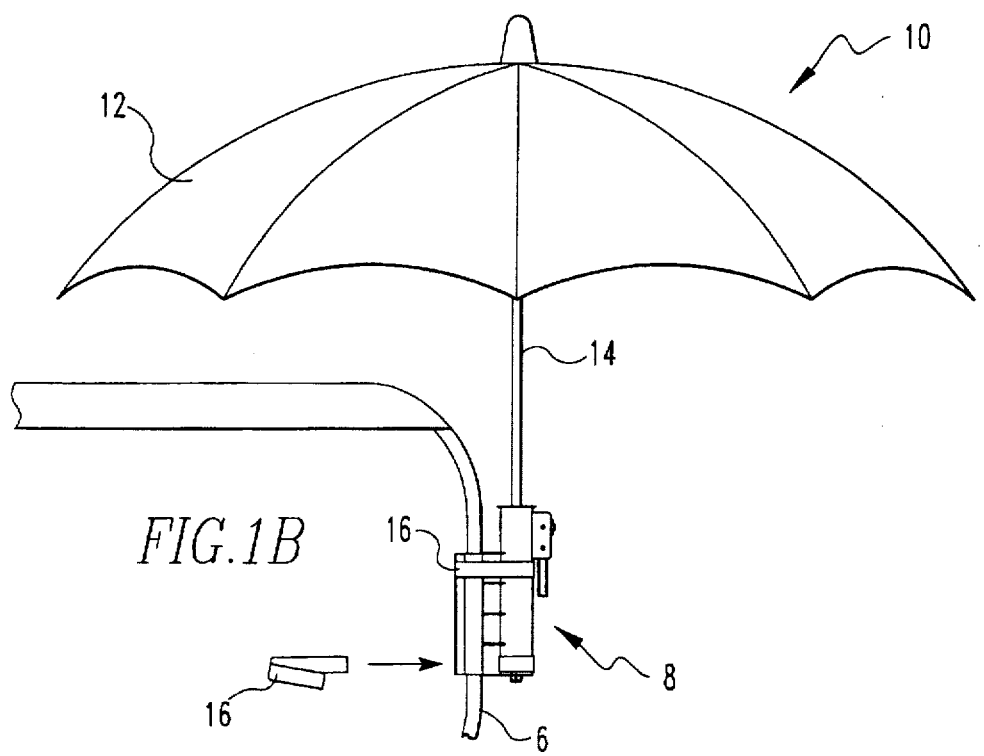
FIG. 1B is an enlarged view of the umbrella, umbrella holder and frame member of FIG. 1A.

With reference to FIGS. 1A and 1B, a golf cart 2 includes a fixed canopy 4 suspended over a seating area S by one or more frame members 6. Attached to one of the frame members 6 is an umbrella holder 8 in accordance with the present invention. The umbrella holder 8 is adapted to hold an umbrella 10 having a deployable canopy 12 and a shaft 14. One or more removable straps 16, preferably Velcro® straps, can be secured around the umbrella holder 8 and the frame member 6. The straps 16 help stabilize and secure the umbrella holder 8 to the frame member 6, but are not mandatory.

Figure 2:
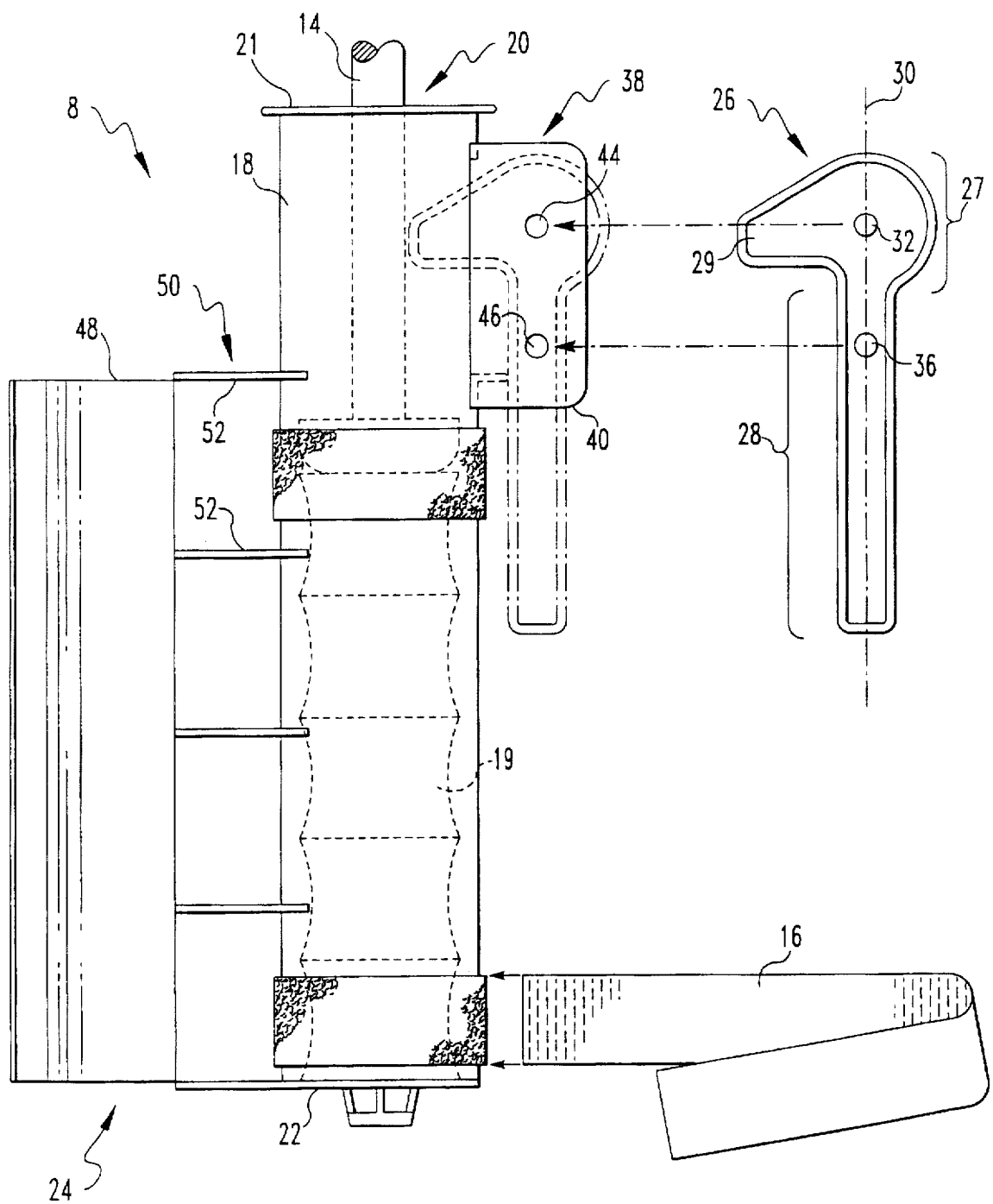
FIG. 2 is an exploded elevational view of one side of the umbrella holder of FIGS. 1A and 1B.

With reference to FIG. 2, the umbrella holder 8 includes a container 18, preferably a hollow cylinder or sleeve, having an inner diameter sufficient to receive a handle 19 of the umbrella 10. More specifically, the container 18 has an upper open end 20 having a lip 21 formed therearound. The open end 20 of the container 18 is adapted to receive the handle 19. The lower end of the container 18 opposite the open end 20 has a restriction 22 formed therein which restricts the handle 19 of the umbrella 10 from passing therethrough. The container 18 has a clamp 24, to be described in greater detail hereinafter, attached to and extending laterally from an outer surface of the container 18.

Figure 3:
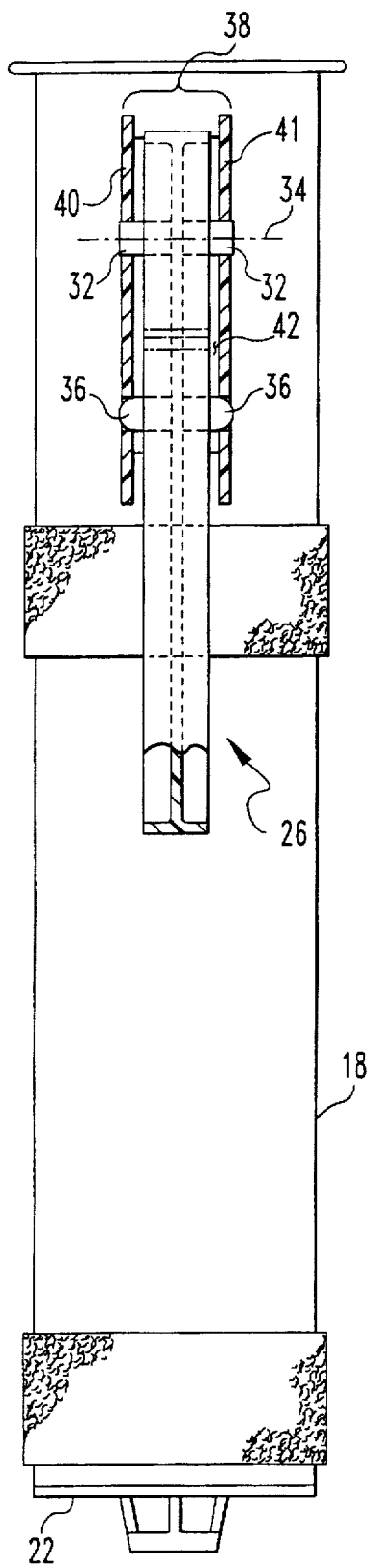
FIG. 3 is an elevational view of one end of the umbrella holder of FIG. 2.

With reference to FIG. 3 and with continuing reference to FIG. 2, the umbrella holder 8 includes a lever 26 having a head 27 formed at one end thereof and a handle 28 extending from the head 27. The head 27 has a protrusion 29 that, preferably, extends laterally from a longitudinal axis 30 of the lever 26. The lever 26 includes a pair of pivot pins 32 extending in opposition from opposite sides of the head 27 of the lever 26. The pivot pins 32 define a pivot axis 34 that is, preferably, orthogonal to the longitudinal axis 30 and the protrusion 29.

The lever 26 includes a pair of bosses 36 preferably positioned on the handle 28 between the pivot pins 32 and the end of the lever 26 opposite the head 27. The bosses 36 extend in opposition from opposite sides of the lever 26 and are preferably aligned with the pivot pins 32 along the longitudinal axis 30 of the lever 26.

The container 18 includes a lever or latch support 38 which extends laterally from an outer surface of the container 18 and which has a first arm or side 40 and a second arm or side 41 positioned in opposition on opposite sides of a lengthwise gap or slot 42 formed in the body of the container 18. The first arm 40 has a pivot aperture 44 and a locking aperture 46 formed therein and in opposition with a respective pivot aperture 44 and a locking aperture 46 of the second arm 41. The pivot apertures 44 are preferably positioned adjacent the open end 20 of the container 18 and are adapted to receive and coact with the pivot pins 32. The locking apertures 46 are positioned on a side of the pivot apertures 44 opposite the open end 20 of the container 18. The locking apertures 46 are adapted to receive and coact with the bosses 36 to releasably lock the lever 26 and the second clamp 38 together when the protrusion 29 extends into the container 18 through the gap 42.

Figure 4:
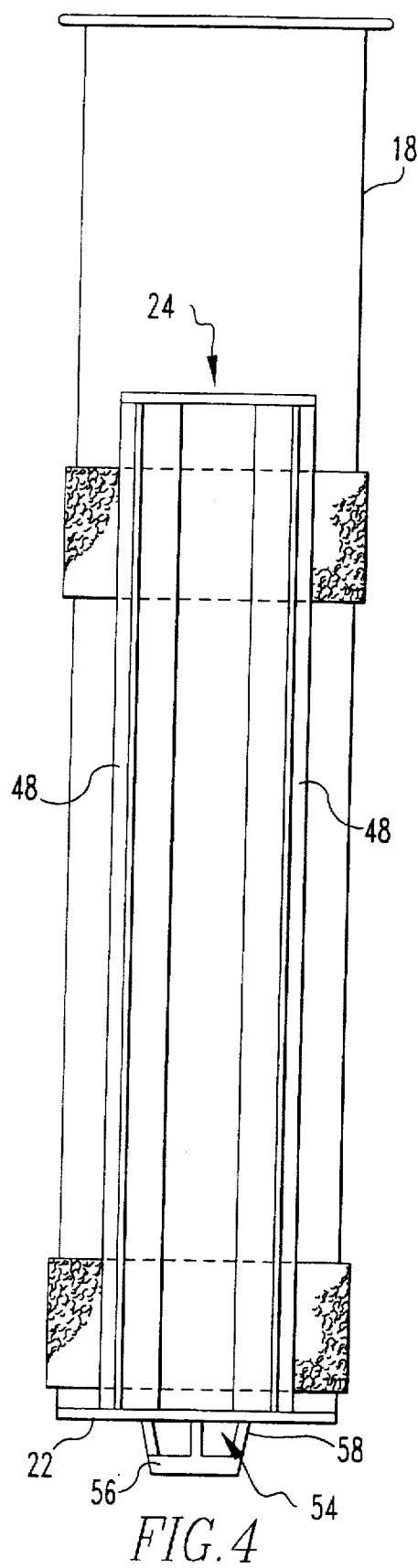
FIG. 4 is an elevational view of the other end of the umbrella holder of FIG. 2.
Figure 5:
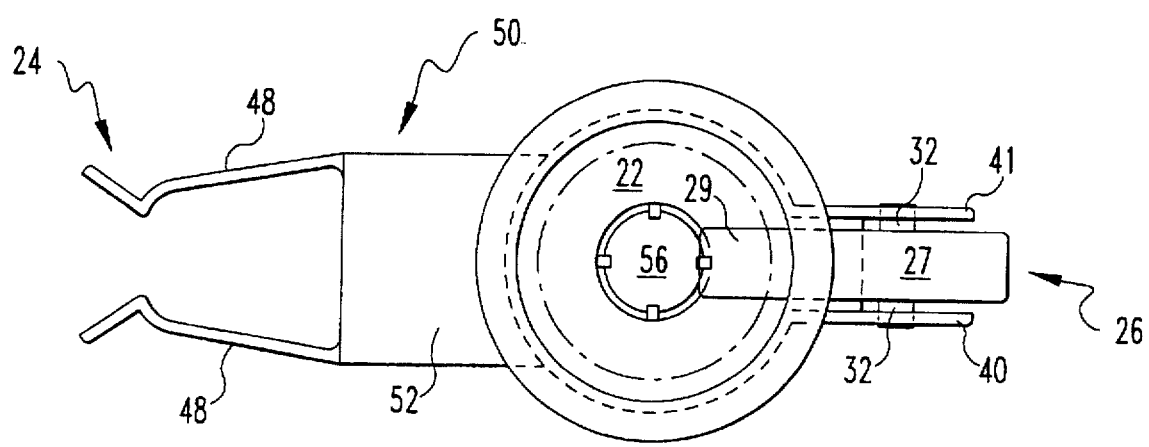
FIG. 5 is a top view of the umbrella holder of FIG. 2.

With reference to FIGS. 4 and 5 and with continuing reference to FIGS. 2 and 3, the clamp 24 extends laterally from the outer surface of the container 18 and has a pair of opposed sides 48 that extend lengthwise along at least a portion of the container 18. The clamp 24 is formed of a material having a spring constant that enables the opposed sides 48 thereof to diverge and receive the frame member 6. The spring constant of the clamp 24 also enables the opposed sides 48 to clamp the received frame member 6 therebetween.

A rib assembly 50 extends between the outer surface of the container 18 and the clamp 24. The rib assembly 50 includes one or more ribs 52 which provide structural support between the clamp 24 and the container 18.

The restriction 22 is preferably washer shaped and has a central aperture or drain 54 aligned with the longitudinal axis of the container 18. In a preferred embodiment, a disc 56 is positioned outside the container 18 adjacent the restriction 22 and, preferably, coaxially with the central aperture 54 of the restriction 22. A plurality of support ribs 58 extend between the restriction 22 and the disc 56. Preferably, the support ribs 58 extend between the inside of the central aperture 54 and the outside of the disc 56.

With reference to FIGS. 6A and 6B, in operation, the lever 26 is pivotable around the pivot pins 32 received in the pivot apertures 44 of the lever support 38. When the handle 28 of the lever 26 is moved away from the container 18, the protrusion 29 is positioned outside the container 18. The absence of the protrusion 29 extending into the container 18 through the gap 42 provides a substantially unobstructed path for the handle 19 to be received in or removed from the container 18.

With reference to FIGS. 7A and 7B, pivoting the handle 28 of the lever 26 toward the container 18 causes the protrusion 29 to move through the gap 42 and into the container 18. The lever support 38 is formed of a material having a spring constant which enables the opposing arms 40, 41 thereof to diverge in response to the bosses 36 engaging opposing faces thereof. More specifically, the ends of the first arm 40 and the second arm 41 opposite the container 18 diverge when the lever 26 moves the bosses 36 therebetween.

Figure 8B:
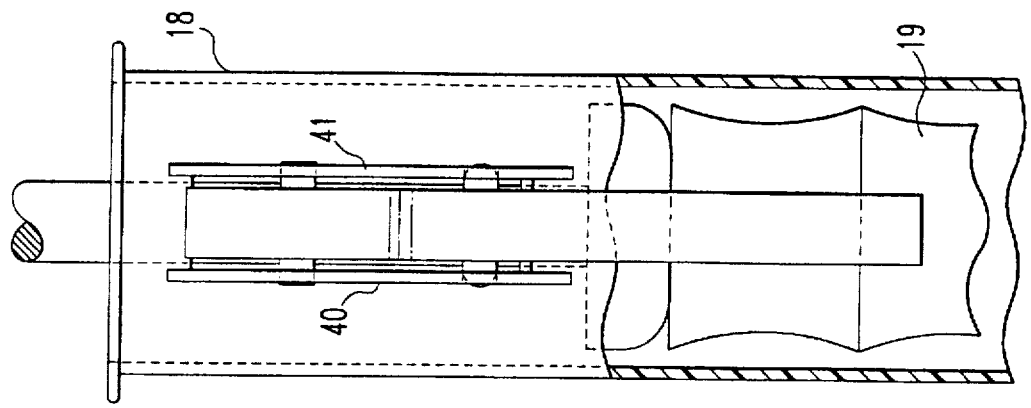
FIG. 8B is an end view, similar to FIGS. 6B and 7B, of the umbrella holder of FIG. 8A.
Figure 8A:
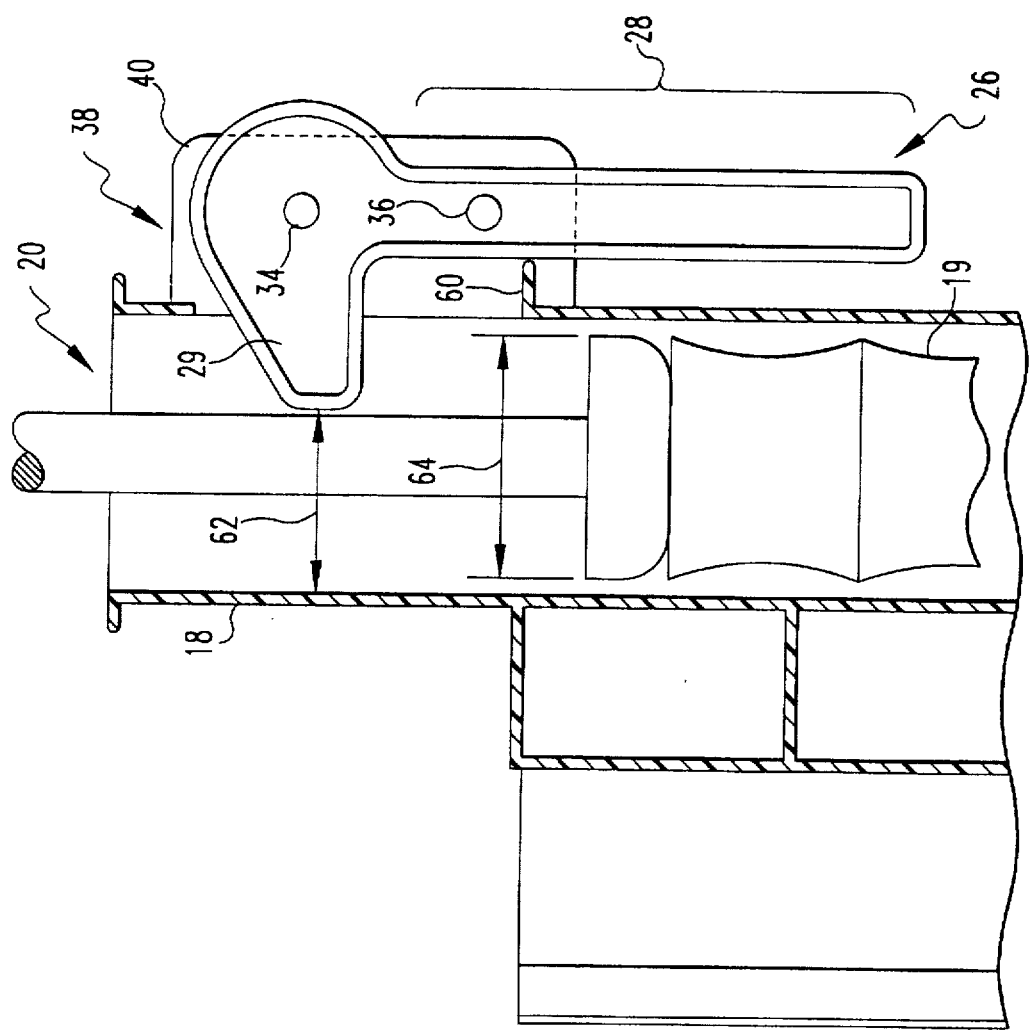
FIG. 8A is a side view, similar to FIGS. 6A and 7A, of a portion of the umbrella holder of FIG. 2 with the lever in an innermost position.

With reference to FIGS. 8A and 8B, pivoting the handle 28 of the lever 26 into contact with a projecting edge 60 formed at a lower end of the gap 42 moves the bosses 36 into alignment with the locking apertures 46. The spring constant of the lever support 38 enables the first and second arms 40, 41 to move together to receive the bosses 36 in the locking apertures 46. The locking apertures 46 coact with the bosses 36 to releasably lock the lever 26 and the lever support 38 together when the protrusion 29 extends into the container 18 through the gap 42. The protrusion 29 and the inside wall of the container 18 coact to form an interstice 62 smaller than the diameter 64 of the umbrella handle 19. Preferably, the ends of the bosses 36 have a generally spherical shape which enables the bosses 36 to be disengaged from the locking apertures 46 when the handle 28 of the lever 26 is pivoted away from the container 18.

The lever 26, the lever support 38 and the container 18 coact so that attempted extraction of the umbrella 10 from the container 18 engages the umbrella handle 19 and the protrusion 29. This engagement rotates the lever 26 about the pivot axis 34 and causes the handle 28 of the lever 26 to be urged into contact with the container 18, and more particularly, into contact with the projecting edge 60. In this manner, undesired extraction of the umbrella handle 19 from the container 18 is avoided. If it is desired to remove the umbrella handle 19 from the container 18, the handle 28 of the lever 26 is pivoted away from the container 18. This pivoting causes the protrusion 29 to move from the inside of the container 18 to the outside of the container 18 through the gap 42 thereby creating an unobstructed path for removal of the umbrella handle 19 from the container 18.

In the preferred embodiment, the container 18, the clamp 24 and the lever support 38 are formed of plastic and as an integral piece. The lever 26 is, preferably, formed from the same plastic but as a separate piece that is secured to the lever support 38 by projecting the pivot pins 36 through the pivot apertures 44.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

I claim:

1. An umbrella holder comprising:
    a container adapted to receive a handle of an umbrella through an open end thereof, the container having a side wall with a slot extending therethrough;
    a clamp attached to the container and adapted to secure the container to a frame member;
    a latch support having a pair of opposing arms attached to the container on opposite sides of the slot in the container; and
    a latch attached to the latch support between the opposing arms thereof and pivotable about a pivot axis extending therebetween, with the latch having a boss that is receivable in a locking aperture formed in one of the opposing arms, with the latch having a protrusion that is moveable into and out of the container through the slot in response to pivoting the latch between the opposing arms and about the pivot axis, and with the protrusion and an inside wall of the container coacting to form an interstice smaller than the diameter of the umbrella handle when the protrusion extends into the container and the boss is received in the locking aperture.

2. The umbrella holder as set forth in claim 1, wherein the latch, the latch support and the container coact so that outward movement of the umbrella handle from the container causes the umbrella handle to contact the protrusion, which rotates the latch about the pivot axis and moves a handle of the latch toward the container.

3. The umbrella holder as set forth in claim 1, wherein:
    the container is a cylindrical member which has an open end for receiving the umbrella handle and a substantially closed end opposite the open end;
    the receiving aperture is longer than the umbrella handle; and
    the interstice is formed between the umbrella handle and the open end of the container.

4. The umbrella holder as set forth in claim 1, wherein the substantially closed end of the container includes a drain aperture therethrough.

5. The umbrella holder as set forth in claim 1, further including at least one rib extending between the container and the clamp.

6. The umbrella holder as set forth in claim 1, further including at least one strap positionable around the container, the clamp and the frame member received therein, the strap coacting with the container and the clamp to more securely attach the umbrella holder to the frame member.

7. An umbrella holding apparatus comprising:

a sleeve adapted to receive an umbrella handle through an open end thereof, the sleeve having a restriction at the end thereof opposite the open end and designed to restrict the umbrella handle from passing through the sleeve;

a clamp attached to the sleeve, the clamp having opposing sides adapted to receive a frame member, the clamp having a spring constant which enables the opposing sides thereof to diverge to receive the frame member and to clasp the frame member received therebetween;

a lever having a laterally extending protrusion at one end thereof, a pair of pivot pins extending in opposition from opposite sides of the lever adjacent the protrusion and forming a pivot axis of the lever perpendicular to a longitudinal axis of the lever, and a pair of bosses positioned between the pivot pins and the end of the lever opposite the protrusion and extending in opposition from opposite sides of the lever; and a lever support having a pair of opposed arms attached on opposite sides of a slot formed in the sleeve, one arm having a pivot aperture and a locking aperture in opposition with a respective pivot aperture and a locking aperture in the other arm, the pivot apertures positioned adjacent the open end of the sleeve and adapted to receive the pivot pins therein, the locking apertures positioned on a side of the pivot apertures opposite the open end of the sleeve and adapted to receive the bosses therein, wherein:

the lever is pivotable around the pivot pins received in the pivot apertures so that the protrusion of the lever is moveable through the slot between a position outside the sleeve and a position inside the sleeve; and the bosses are receivable in the locking apertures, with the bosses and the locking apertures coacting to releasably lock the lever between the pair of arms of the lever support when the protrusion of the lever is positioned inside the sleeve.

8. The umbrella holding apparatus as set forth in claim 7, wherein:

the lever further includes a head and a lever; and the protrusion and the lever extend from the head in different directions.

9. The umbrella holding apparatus as set forth in claim 7, wherein the lever support has a spring constant which enables the pair of arms thereof to diverge in response to the bosses engaging opposing faces thereof.

10. The umbrella holding apparatus as set forth in claim 9, wherein the spring constant of the lever support resists movement of the lever that disengages the bosses from receipt in the locking apertures.

11. The umbrella holding apparatus as set forth in claim 7, further including at least one rib extending between the sleeve and the clamp.

12. The umbrella holding apparatus as set forth in claim 7, wherein the restriction at the end of the sleeve opposite the open end has a central aperture therethrough.

13. The umbrella holding apparatus as set forth in claim 12, further including a disc positioned outside the sleeve and coaxial with the central aperture of the restriction and a plurality of support ribs extending between the restriction and the disc.

14. An umbrella holder for holding an umbrella handle, the umbrella holder comprising:

a hollow cylinder having an open first end, a second end having at least a partial restriction thereacross and a slot formed adjacent the open first end;

a clamp attached to the cylinder and having a pair of opposed sides, the clamp having a spring constant that enables the opposed sides to diverge and receive a frame member and enables the opposed sides to clamp the received frame member therebetween;

a lever having a protrusion at a head end thereof, a first pair of pivot pins positioned on opposite sides of the lever adjacent the head end of the lever and a pair of bosses positioned on opposite sides of the lever between the pivot pins and an end of the lever opposite the head end; and a lever support attached to the cylinder, and having a first arm and a second arm opposed to each other and positioned on opposite sides of the slot, the first arm having a pivot aperture and a locking aperture formed therein and in opposition with a pivot aperture and a locking aperture formed in the second arm, the pivot apertures receive and coact with the pivot pins to form a pivot between the lever and the lever support, the locking apertures receive and coact with the bosses to releasably lock the lever and the lever support together when the protrusion extends into the cylinder through the slot.

* * * * *